(No Model.)

E. P. OVESON.
DETACHABLE SHOVEL BLADE FOR FORKS.

No. 596,120. Patented Dec. 28, 1897.

Witnesses
C. W. Bradway.
Victor J. Evans

Inventor
Edward P. Oveson.
By John Wedderburn, Attorney

THE NORRIS PETERS CO., PHOTO-LITHO., WASHINGTON, D. C.

UNITED STATES PATENT OFFICE.

EDWARD P. OVESON, OF NASH, NORTH DAKOTA.

DETACHABLE SHOVEL-BLADE FOR FORKS.

SPECIFICATION forming part of Letters Patent No. 596,120, dated December 28, 1897.

Application filed April 30, 1897. Serial No. 634,606. (No model.)

*To all whom it may concern:*

Be it known that I, EDWARD P. OVESON, of Nash, in the county of Walsh and State of North Dakota, have invented certain new and useful Improvements in Detachable Shovel-Blades for Forks; and I do hereby declare the following to be a full, clear, and exact description of the invention, such as will enable others skilled in the art to which it appertains to make and use the same.

This invention relates to forks and shovels; and it consists, essentially, of a detachable shovel-blade adapted to be removably applied to a fork through mechanism which will conceal and protect the ends of the fork-tines.

The invention further consists of the details of construction and arrangement of the several parts, which will be more fully hereinafter described and claimed.

Figure 1:
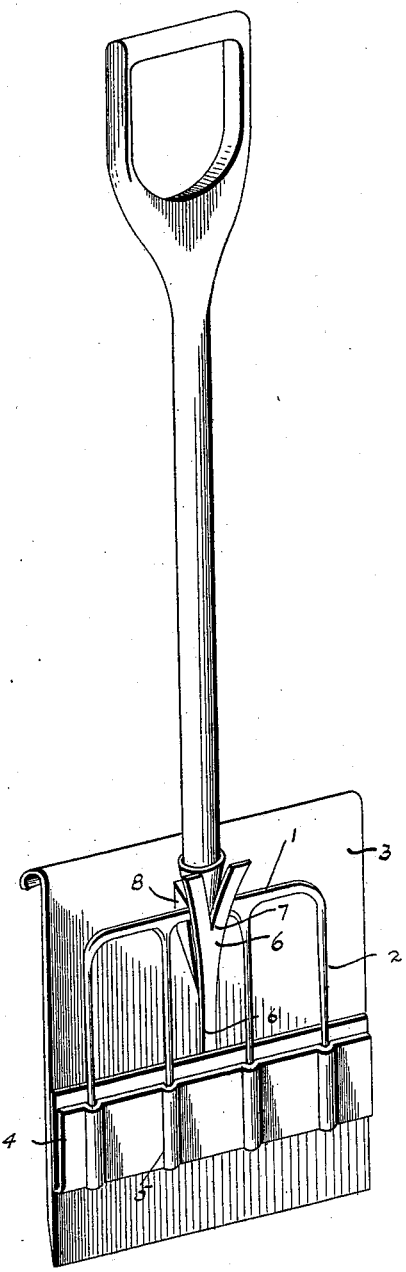
Figure 2:
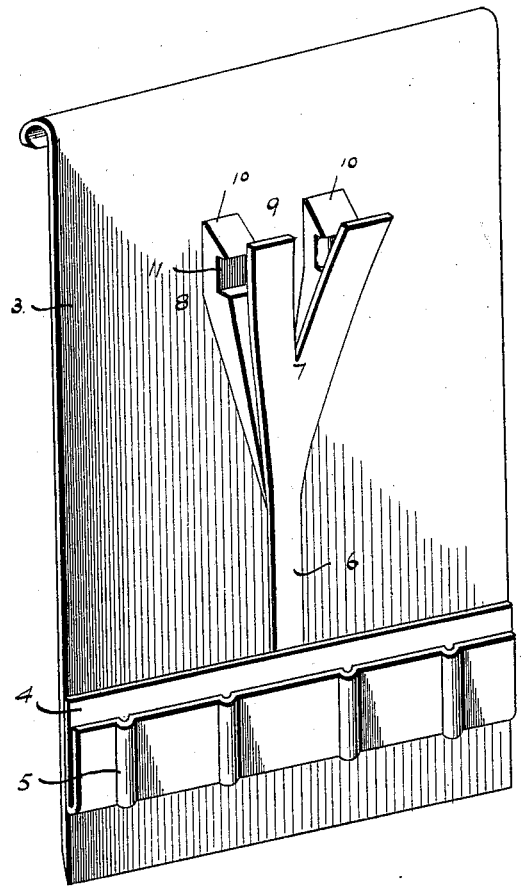

In the accompanying drawings, Figure 1 is a perspective view of a fork, showing the improved shovel attachment applied thereto and looking toward the rear. Fig. 2 is a detail perspective view of the shovel attachment disconnected.

Referring to the drawings, wherein similar numerals of reference are employed to indicate corresponding parts in the views, the numeral 1 designates a fork having tines 2, as shown in Fig. 1. The said fork is adapted to be removably attached to the improved shovel-blade 3, which may be either in shovel or scoop form, and has at the lower rear portion thereof a rebent sheet-metal strip 4 applied thereto having a series of fork-recesses 5, arranged at regular intervals and conforming in shape to the tapered pointed ends of the tines 2. These recesses are formed by striking out the rebent portion of the sheet-metal strip and completely cover the ends of the tines, so as to protect the same from injury. Extending centrally over the rear part of the blade 3 is a keeper 6, having its lower end held under the rebent strip 4 and its upper end extended and bifurcated, as at 7. The said bifurcated end of the keeper normally stands outward a certain distance from the rear of the shovel and over a catch 8, having an upper bifurcated portion 9 with beveled ends 10 and a transverse groove or recess 11. The ends of the bifurcated portions 7 of the keeper project over the groove or recess 11 and are slightly flared outwardly to permit connection therewith of the head of the tines and a part of the handle of the fork, the said head resting in the groove 11 and being held therein by the bifurcated portion 7 of the keeper against accidental disengagement.

The beveled ends 10 of the bifurcated part of the catch permit the head of the tines to readily move into position into the recess and be locked therein by the said keeper. By this means the fork can be attached to the shovel-blade without requiring the use of the hands of the operator directly applied to the said blade, and in disconnecting the several parts the upper bifurcated end of the keeper is sprung outwardly to permit the head of the tines to be drawn from the groove 11. The handle of the fork removably slides into the bifurcated portion of the catch, and by this means the said fork is held closely against the shovel-blade.

In the construction of the shovel-blade sheet metal is preferably used, though the attachment could be applied equally well to a blade formed of any other material.

By arranging the recesses 5 at regular intervals and spaced apart, as shown, the fork is prevented from turning or moving laterally when in connection with the blade, and an effectual attachment is thereby provided.

It is obviously apparent that many minor changes in the details of construction and arrangement of the several parts might be made and substituted for those shown and described without in the least departing from the nature or spirit of the invention.

Having thus described the invention, what is claimed as new is—

1. The combination with a fork having a handle, of a detachable shovel-blade provided with a series of independent recesses to receive the ends of the tines of the fork, a catch having a bifurcated end, and a transverse groove and a yielding bifurcated keeper normally standing out from and over the said catch, substantially as and for the purposes specified.

2. The combination with a fork having a handle, of a detachable shovel-blade provided with a series of independent recesses to receive the ends of the tines, a catch having a bifurcated end and a transverse groove, the opposite portions of the bifurcation being beveled, and a keeper having an upper bifurcated end extending over and standing outward from the said catch, substantially as and for the purposes specified.

In testimony whereof I have signed this specification in the presence of two subscribing witnesses.

EDWARD P. OVESON.

Witnesses:
H. Y. VICK,
JEFF. M. MYERS.